United States Patent
Zhang et al.

(10) Patent No.: US 11,674,280 B2
(45) Date of Patent: Jun. 13, 2023

(54) SAND SETTING CIRCULATING DEVICE FOR WAVE-CURRENT TANK TEST TAILINGS

(71) Applicant: Fishery Engineering Research Institute, Chinese Academy Of Fishery Sciences, Beijing (CN)

(72) Inventors: Xi Zhang, Beijing (CN); Riming Zhao, Nanjing (CN)

(73) Assignee: Fishery Engineering Research Institute, Chinese Academy Of Fishery Sciences, Beijing (CN)

( * ) Notice: Subject to any disclaimer, the term of this patent is extended or adjusted under 35 U.S.C. 154(b) by 0 days.

(21) Appl. No.: 17/854,081

(22) Filed: Jun. 30, 2022

(65) Prior Publication Data
US 2023/0120957 A1    Apr. 20, 2023

(30) Foreign Application Priority Data
Oct. 18, 2021   (CN) .......................... 202111210876.5

(51) Int. Cl.
*B01D 21/24* (2006.01)
*E02B 1/02* (2006.01)
*B01D 21/32* (2006.01)

(52) U.S. Cl.
CPC ............ *E02B 1/02* (2013.01); *B01D 21/2444* (2013.01); *B01D 21/2477* (2013.01); *B01D 21/32* (2013.01)

(58) Field of Classification Search
CPC ........ B01D 21/2444; B01D 21/32; E02B 1/02
See application file for complete search history.

(56) References Cited

FOREIGN PATENT DOCUMENTS

| CN | 201510785 U | 6/2010 | |
|---|---|---|---|
| CN | 202157298 U | 3/2012 | |
| CN | 204389144 U | 6/2015 | |
| CN | 106315713 A | * 1/2017 | |
| CN | 211571596 U | 9/2020 | |
| CN | 112747896 A | 5/2021 | |
| CN | 113101703 A | * 7/2021 | ............ B01D 21/02 |

OTHER PUBLICATIONS

Sediment Professional Committee of Chinese Hydraulic Society, "Control System, Sediment Manual", Apr. 30, 1992, p. 840.

* cited by examiner

*Primary Examiner* — Bradley R Spies

(57) ABSTRACT

Provided is a sand setting circulating device for wave-current tank test tailings. A sand collection device is arranged at a front end of a tail gate of a tank body for performing primary collection on a bed-load sand body with a large particle size; a sand-water separating device is arranged at a tail end of the tank body for performing sand-water separation on tail water subjected to energy dissipation so as to perform secondary collection on a suspended load sand body with a small particle size, the sand-water separating device comprising a collection barrel and a sand suction device mounted in the collection barrel; a water outlet is formed in an upper part of the collection barrel, and separated clear water flows into a clear water reservoir through a water return pipe for cyclic utilization; and a computer is arranged for intelligent control.

7 Claims, 1 Drawing Sheet

SAND SETTING CIRCULATING DEVICE FOR WAVE-CURRENT TANK TEST TAILINGS

CROSS REFERENCE TO RELATED APPLICATIONS

This application claims foreign priority of Chinese Patent Application No. 202111210876.5, filed on Oct. 18, 2021 in the China National Intellectual Property Administration, the disclosures of all of which are hereby incorporated by reference.

TECHNICAL FIELD

The present invention relates to the technical field of hydraulic model tests, and more particularly, to a sand setting circulating device for wave-current tank test tailings.

BACKGROUND

A sediment movement test is an important part of a hydraulic model test. In marine and coastal engineering, tests such as a turbulent structure and a sand transportation law of a sand-carried current and a relationship between a turbulence burst and a sediment movement must be completed by the sediment movement test. Therefore, in a tank model test, it is necessary to perform water-sand separation on test tailings and keep continuous long-term cyclic conversion when the above sediment movement test is performed by using a wave-current power.

At present, in a wave-current tank, a herringbone tail gate is mounted at a tail end of the tank, and the water-sand separation is performed on the test tailings by mounting a sand collection cup at a front end of the tail gate. However, in fact, due to a current power and other factors, the sand collection cup can only collect 50% to 65% of the test tailings, and heavy and coarse bottom sands are basically collected, while light and fine suspended sands cannot be collected by the sand collection cup, so that the tailings enter a water return pipe along with a current at a downstream of the wave-current tank, and then enter the clear water reservoir for the test. As time passes, a lot of the test tailings may accumulate in the clear water reservoir, resulting in a turbid water body in the clear water reservoir, and the water body cannot be used for other clear water tests, which means that the water body cannot be recycled, resulting in waste of a lot of the water body.

SUMMARY

The present invention aims to overcome the above defects, and provide a sand setting circulating device for wave-current tank test tailings. A sand collection device is arranged at a front end of a tail gate of a tank body for performing primary collection on a bed-load sand body with a large particle size, and an energy dissipation device is mounted at a rear end of the tail gate of the tank body, which greatly reduces turbulent energy of a current; a sand-water separating device is arranged at a tail end of the tank body for performing sand-water separation on tail water subjected to energy dissipation so as to perform secondary collection on a sand body with a small particle size, the sand-water separating device comprising a collection barrel and a sand suction device mounted in the collection barrel; a water outlet is formed in an upper part of the collection barrel, and separated clear water enters a clear water reservoir through a water return pipe for cyclic utilization; and a computer is arranged for intelligent control, so the problems of a traditional sand setting system are effectively solved, and the test cost is effectively reduced.

The specific technical solution provided by the present invention is as follows.

A sand setting circulating device for wave-current tank test tailings comprises:

a tank body which is a container for bearing a test water body and comprises a tank, wherein a tail end of the tank is sequentially provided with a sand collection device for collecting a sand body with a large particle size, a tail gate device for controlling a water level and an energy dissipation device for reducing turbulent energy of a current along a current direction;

a sand-water separating device located at the tail end of the tank body for separating a sand body with a small particle size from tail water discharged from the tank, and comprising a collection device and a sand suction device, wherein the sand suction device sucks the sand body with the small particle size by a centripetal force generated by a rotating device provided;

a driving device for driving the tail gate device and the sand-water separating device to execute corresponding actions according to instructions, and comprising a driving motor; and a control device for controlling the driving device to execute the instructions in real time according to a preset program, and comprising a computer.

Preferably, the tank body further comprises supporting frames uniformly arranged along the current direction for supporting the tank, and a side wall of the tank between adjacent supporting frames is a transparent wall.

Further, an inner wall of the tank is further provided with a water level sensing device, the water level sensing device is connected with the computer, and the computer controls the tail gate device in real time according to water level information.

Further, the sand collection device comprises a sand collection cup mounted on a bottom of the tank with an upward opening, so that a sand body with a large particle size sets into the sand collection cup due to a self-gravity and is naturally collected under an action of a vortex water body.

Preferably, the collection device comprises a sand collection barrel with a hollow cavity inside and an upper end opening, the sand collection barrel comprises a cylinder with a large diameter at an upper part, a cylinder with a small diameter at a lower part and a cone connected therebetween, and the sand suction device is mounted in the hollow cavity in the sand collection barrel.

Further, the sand suction device comprises the driving motor, a transmission shaft with a hollow cavity which is rotatable under the drive of the driving motor, and the rotating device vertically and fixedly mounted on the transmission shaft.

Further, the rotating device comprises an impeller, the impeller is located at an upper end part of the cylinder with the small diameter, and a diameter of the impeller is matched with an inner diameter of the cylinder with the small diameter, so that a centripetal force generated when the impeller rotates with the transmission shaft is capable of sucking out the sand body with the small particle size along the hollow cavity to realize sand-water separation.

Further, the transmission shaft coincides with a central axis of the sand collection barrel, and an interval is provided between a sand suction port arranged at a lower end of the transmission shaft and a bottom of the sand collection barrel.

Further, the cylinder with the large diameter at an upper part of the sand collection barrel is provided with a water outlet, and the water outlet is connected with a clear water reservoir through a water return pipe.

Further, the computer comprises a storage unit and a control unit; the storage unit is configured for storing a test program, an instruction and collected data information, and the control unit is connected with the driving motor and a tail gate controller.

Beneficial Effects

The present invention provides the sand setting circulating device for the wave-current tank test tailings. The sand collection device is arranged at the front end of the tail gate of the tank body for performing primary collection on the bed-load sand body with the large particle size, and the energy dissipation device is mounted at the rear end of the tail gate of the tank body, which greatly reduces the turbulent energy of the current; the sand-water separating device is arranged at the tail end of the tank body for performing sand-water separation on the tail water subjected to energy dissipation so as to perform secondary collection on the sand body with the small particle size, the sand-water separating device comprising the collection barrel and the sand suction device mounted in the collection barrel; the water outlet is formed in the upper part of the collection barrel, and the separated clear water enters the clear water reservoir through the water return pipe for cyclic utilization; and the computer is arranged for intelligent control, so the problems of the traditional sand setting system are effectively solved, and the test cost is effectively reduced.

BRIEF DESCRIPTION OF THE DRAWINGS

The drawings described herein are used for providing further understanding for the present application, and constitute a part of the present application. Exemplary embodiments of the present application and the descriptions thereof are used for explaining the present application, and do not constitute any inappropriate limitation to the present application.

In the drawings.

In the drawings.

1 refers to tank base; 2 refers to supporting mechanism; 3 refers to tank; 4 refers to side wall of tank; 5 refers to sand collection cup; 6 refers to tail gate; 7 refers to tail gate controller; 8 refers to energy dissipation net; 9 refers to computer; 10 refers to sand outlet; 11 refers to driving motor; 12 refers to transmission shaft; 13 refers to hollow cavity; 14 refers to water outlet; 15 refers to impeller; 16 refers to sand collection barrel; 17 refers to sand suction port; 18 refers to small cone cavity; 19 refers to fixed plate; 20 refers to sand body; 21 refers to cylinder with large diameter; 22 refers to cylinder with small diameter; 23 refers to water return pipe; 24 refers to clear water reservoir; 25 refers to supporting frame; 26 refers to end cover; and 27 refers to water level meter.

DETAILED DESCRIPTION

If some terms are used to refer to specific components in the specification and the claims, those skilled in the art should understand that hardware manufacturers may refer to the same component by different terms. In the specification and the claims, the components are distinguished by the difference of functions of the components instead of the difference of names. For example, the term "comprising" mentioned throughout the specification and the claims is an open term, and should be interpreted as "comprising but being not limited to". The terms "first" and "second" are used for descriptive purposes only, and cannot be understood as indicating or implying relative importance, or implicitly indicating the number of technical features indicated thereby; the term "several" refers to being more than three; and the following descriptions are the preferred implementations for implementing the present application, but the descriptions are for the purpose of explaining the general principles of the present application, and are not intended to limit the scope of the present application. The scope of protection of the present application should be subject to the scope defined by the appended claims.

Figure 1:
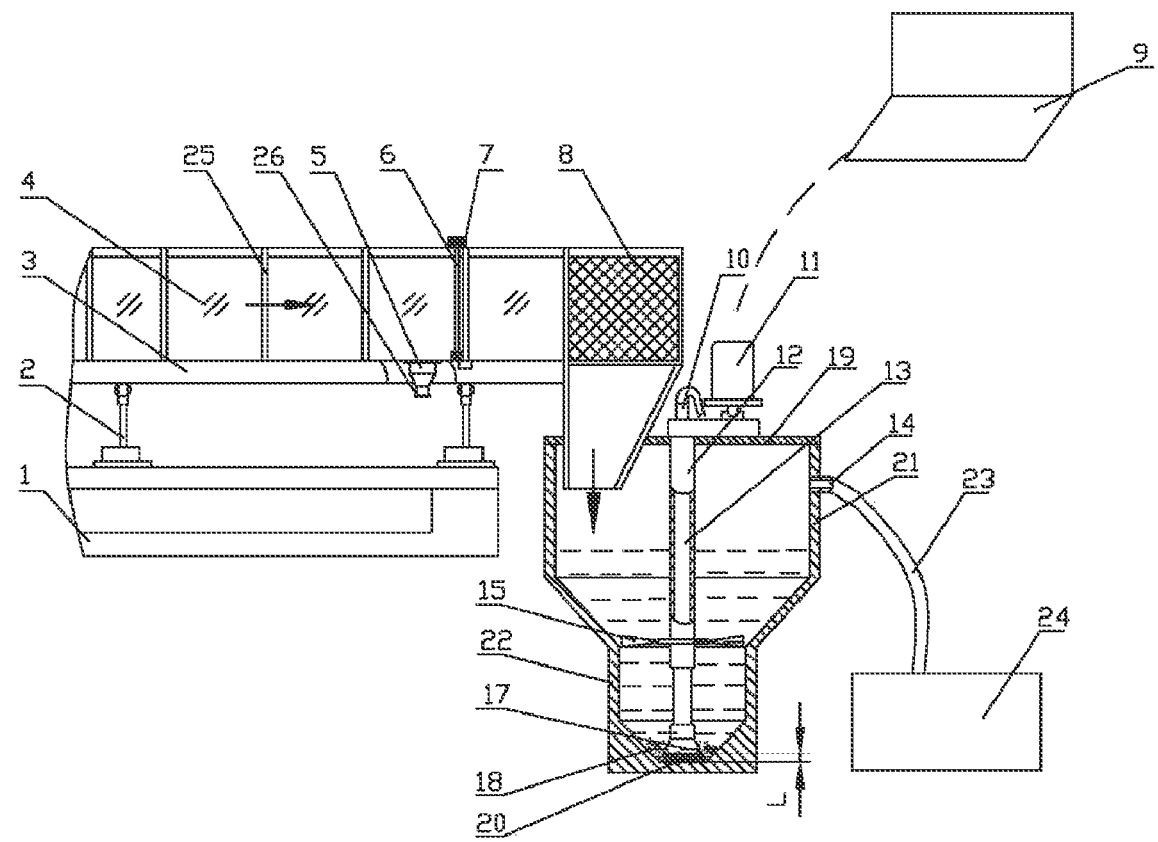
FIG. 1 is a schematic structural diagram of the technical solution of the present invention.
Figure 2:
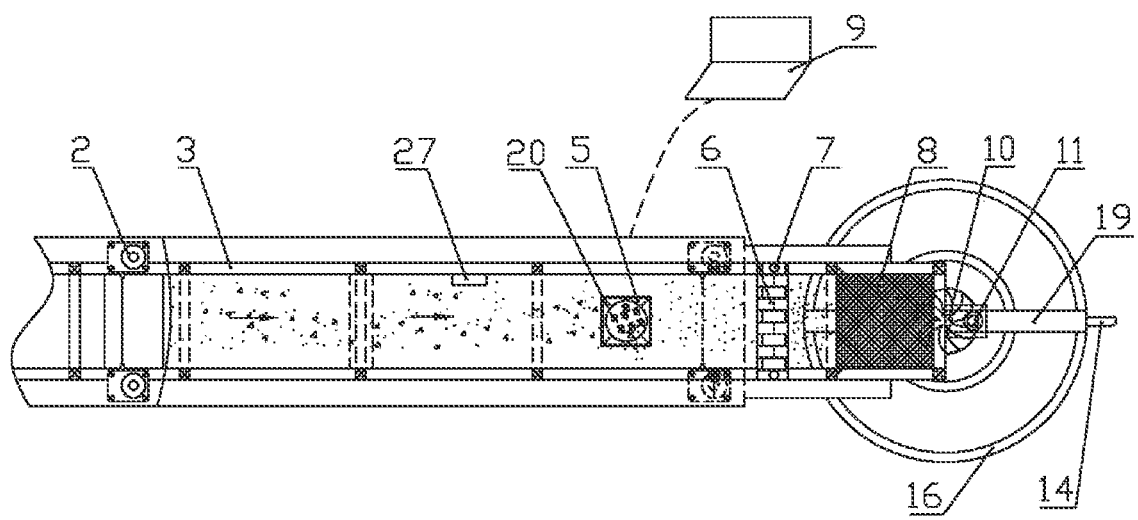
FIG. 2 is a top view of FIG. 1.

In the preferred embodiments of the present invention, with reference to FIG. 1 and FIG. 2:

a sand setting circulating device for wave-current tank test tailings comprises a tank body, a sand-water separating device, a driving motor and a computer 9.

The tank body comprises a tank 3 and supporting frames 25 for supporting the tank 3, a tank base 1 playing a role of foundation is arranged at a lower part of the tank 3, and a bottom of a supporting mechanism 2 is fixedly mounted on the tank base 1, and a top end of the supporting mechanism is connected with a bottom of the tank body.

A plurality of supporting frames 25 are provided, which are uniformly arranged around the tank 3 along a current direction, and a side wall 4 of the tank between adjacent supporting frames 25 is a transparent wall made of a glass material, which is convenient for test observation.

A tail end of the tank 3 is sequentially provided with a sand collection cup 5 for collecting a sand body with a large particle size, a tail gate 6 for controlling a water level and an energy dissipation net 8 for reducing turbulent energy of a current along the current direction.

The tail gate 6 is mounted on the tank 3 through a bolt, a tail gate controller 7 is mounted on the tail gate 6 through a bolt, and the tail gate controller 7 is connected with the computer 9. A water level meter 27 is also fixedly mounted on the side wall 4 of the tank, the water level meter 27 is connected with the computer 9, and the water level meter 27 transmits detected water level information to the computer 9 and stores the information in a storage unit. A control unit controls the tail gate controller 7 in real time according to a preset water level and the water level information transmitted by the water level meter 27, and the tail gate controller 7 controls the tail gate 6 to rise or fall, so as to maintain the water level in the tank 3 to meet a preset test requirement.

The sand collection cup 5 is mounted on a bottom of the tank 3, and located at a position about 50 cm from a front end of the tail gate 6, and a cup opening is connected with a bottom plane of the tank 3 through a sealant. An end cover 26 is movably mounted at a lower end of the sand collection cup 5 through a thread. When the test tailings move above the sand collection cup 5 due to a current power, a flow speed of the current can be reduced sharply due to a water blocking effect of the tail gate 6, and a secondary vortex water body environment is formed above the sand collection cup 5. At the moment, a sand body 20 with a large particle size may set into the sand collection cup 5 due to a self-gravity to realize primary collection of the sand body 20 with the large particle size. For the collected sand body 20, the end cover 26 at the lower end of the sand collection cup 5 may be opened after the test to discharge the sand body 20 for the next cyclic utilization.

The sand-water separating device is mounted below the tail end of the tank body, and comprises a sand collection barrel 16 and a sand suction device.

A sand body 20 with a small particle size passes through the energy dissipation net 8 with the current and then flows into the sand collection barrel 16.

The sand collection barrel 16 is composed of a cylinder 21 with a large diameter at an upper end, a cylinder 22 with a small diameter at a lower end and a cone connected therebetween, with a hollow cavity in a middle part. An upper end of the cylinder 21 with the large diameter is opened, the upper end of the cylinder 21 with the large diameter is provided with a water outlet 14, and a lower end cavity of the cylinder 22 with the small diameter is a tapered small cone cavity 18, so that the sand body 20 with the small particle size is concentrated on the bottom to facilitate suction.

The sand suction device is mounted in the cavity of the sand collection barrel 16, and comprises a fixed plate 19 mounted at an opening part of the sand collection barrel 16 through a fastener and a driving motor 11 fixedly mounted on the fixed plate 19 through a fastener. The driving motor 11 drives a transmission shaft 12 to rotate, the transmission shaft 12 is vertically located in a center of the sand collection barrel 16, and a central axis of the transmission shaft 12 coincides with a central axis of the sand collection barrel 16. An interval L is provided between a sand suction port 17 arranged at a lower end of the transmission shaft 12 and a bottom of the sand collection barrel 16, and L is set to be 3 cm.

Further, an impeller 15 is fastened and mounted on the transmission shaft 12, the impeller 15 is located at an upper end part of the cylinder 22 with the small diameter, and a diameter of the impeller is matched with an inner diameter of the cylinder 22 with the small diameter, so that water and the sand body 20 with the small particle size in the cavity of the cylinder 22 with the small diameter rotate in the cavity when the impeller 15 rotates with the transmission shaft 12. A through hollow cavity 13 is arranged inside the transmission shaft 12, a centripetal force generated by the rotation of the impeller 15 sucks out the sand body 20 with the small particle size along the hollow cavity 13, and the sand body is discharged through a sand outlet 10 to realize secondary collection of the sand body 20 with the small particle size, and realize sand-water separation.

The driving motor 11 is connected with the computer 9, and the computer 9 adjusts a rotation speed of the transmission shaft 12 in real time according to a sand discharge amount of the sand outlet 10, thus adjusting a rotation speed of the impeller 15 in real time, and controlling an amount of the sand body 20 with the small particle size sucked by the sand suction port 17.

Separated tail water passes through a water return pipe 23 from the water outlet 14 at the upper end of the sand collection barrel 16 and then flows into a clear water reservoir 24 to realize cyclic utilization.

The foregoing shows and describes the preferred embodiments of the present application. However, as described above, it should be understood that the present application is not limited to the forms disclosed herein, the preferred embodiments should not be regarded as excluding other embodiments, but can be used in various other combinations, modifications and environments, and can be changed by the above teachings or the technology or knowledge in related fields within the scope of concept of the present application described herein. Moreover, the modifications and changes made by those skilled in the art without departing from the spirit and scope of the present application should all fall within the scope of protection of the appended claims of the present application.

The invention claimed is:

1. A sand setting circulating device for wave-current tank test tailings, provided with a tank body for bearing a test water body, which comprises a tank, wherein:
   a tail end of the tank is sequentially provided with a sand collection device for collecting a sand body with a large particle size at a front end of a tail gate device and a sand-water separating device for separating a sand body with a small particle size at a rear end of the tail gate device along a current direction, and an energy dissipation device for reducing turbulent energy of a current is further arranged in front of the sand-water separating device;
   the sand collection device comprises a sand collection cup, the sand collection cup comprises an upper cylinder with a hollow cavity and a lower cone, an upper end opening of the sand collection cup is mounted on a middle part of a bottom of the tank, and a lower end opening of the sand collection cup is provided with an end cover which is located at a preset position at the front end of the tail gate device, so that the sand body with the large particle size sets into the sand collection cup due to a self-gravity and is naturally collected under an action of a vortex water body; and
   the sand-water separating device comprises a collection device and a sand suction device, the collection device comprises a sand collection barrel for collecting a current subjected to energy dissipation, and the sand collection barrel comprises a cylinder with a large diameter at an upper part, a cylinder with a small diameter at a lower part and a cone connected therebetween; the sand suction device comprises a rotating device, the rotating device comprises an impeller located at an upper end part of the cylinder with the small diameter, and a diameter of the impeller is matched with an inner diameter of the cylinder with the small diameter, so that a centripetal force generated when the impeller rotates with a transmission shaft is capable of sucking out the sand body with the small particle size along the hollow cavity, and an upper end of the cylinder with the large diameter of the sand collection barrel is provided with a water outlet to realize sand-water separation;
   a driving device for driving the sand-water separating device to execute corresponding actions according to instructions, and comprising a driving motor; and
   a control device for controlling the driving device and a tail gate controller to execute the instructions in real time according to a preset program, and comprising a computer, wherein the tail gate controller is configured for controlling the tail gate device to rise or fall.

2. The sand setting circulating device for the wave-current tank test tailings according to claim 1, wherein the tank body further comprises supporting frames uniformly arranged along the current direction for supporting the tank, and a side wall of the tank between adjacent supporting frames is a transparent wall.

3. The sand setting circulating device for the wave-current tank test tailings according to claim 2, wherein an inner wall of the tank is further provided with a water level sensing device, the water level sensing device is connected with the computer, and the computer controls the tail gate device in real time according to water level information.

4. The sand setting circulating device for the wave-current tank test tailings according to claim 1, wherein the sand suction device comprises the driving motor, the transmission shaft with a hollow cavity which is rotatable under the drive of the driving motor, and the rotating device vertically and fixedly mounted on the transmission shaft.

5. The sand setting circulating device for the wave-current tank test tailings according to claim 4, wherein the transmission shaft coincides with a central axis of the sand collection barrel, and an interval is provided between a sand suction port arranged at a lower end of the transmission shaft and a bottom of the sand collection barrel.

6. The sand setting circulating device for the wave-current tank test tailings according to claim 5, wherein the water outlet is connected with a clear water reservoir through a water return pipe.

7. The sand setting circulating device for the wave-current tank test tailings according to claim 3, wherein the computer comprises a storage unit and a control unit; the storage unit is configured for storing a test program, an instruction and collected data information, and the control unit is connected with the driving motor and the tail gate controller.

* * * * *